April 7, 1942.  F. H. DALRYMPLE  2,279,134
CHAIN
Filed April 20, 1940
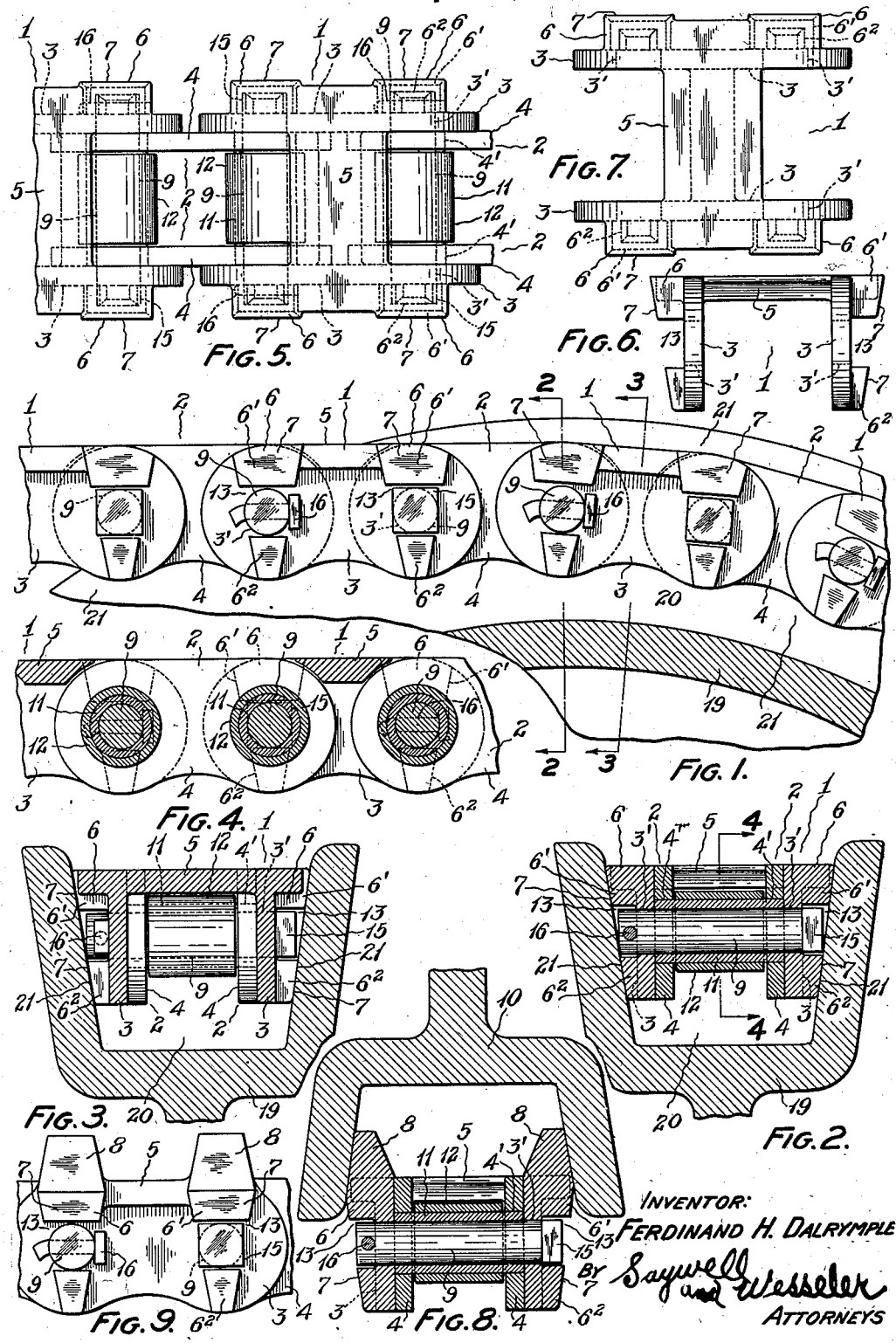
INVENTOR:
FERDINAND H. DALRYMPLE
By Saywell and Wesseler
ATTORNEYS Patented Apr. 7, 1942

2,279,134

UNITED STATES PATENT OFFICE 2,279,134

CHAIN

Ferdinand H. Dalrymple, Bedford, Ohio

Application April 20, 1940, Serial No. 330,743

4 Claims. (Cl. 74—236)

The instant invention relates to chain and particularly to driving chain of the V-type. V-type chain is so-called because it has elements which are formed with outside angular or inclined surfaces designed for frictional driving engagement with the inside walls of the V-shaped groove of an annularly grooved wheel. Although designed primarily for driving action by the described engagement of inclined surfaces with grooved wheels, the instant improvements are also adaptable to sprocket driving, entirely or in part, and, possibly, find their greatest field of action in effecting a driving function from a high speed shaft having a sprocket with which the chain engages to a slow speed shaft having a comparatively large grooved wheel with which the chain frictionally engages. The invention is particularly concerned with a one-piece chain element serving as a link attachment of the V-type for use in many kinds of chain; as also, with chain in which such link attachments are included.

The annexed drawing and the following description set forth in detail certain means illustrating the improved chain, such means constituting, however, only two of the various forms in which the principles of the invention may be embodied.

In said annexed drawing:

Figure 1 is a broken side elevation of the improved chain, a grooved wheel with which the chain frictionally engages being suggested in vertical longitudinal section;

Figure 2 is a broken transverse vertical section, taken in the plane indicated by the line 2—2, Figure 1;

Figure 3 is a broken transverse vertical section, taken in the plane indicated by the line 3—3, Figure 1;

Figure 4 is a broken longitudinal vertical section, taken in the plane indicated by the line 4—4, Figure 2;

Figure 5 is a plan view of a fragmentary portion of the chain shown in Figure 1;

Figure 6 is an end elevation of a one-piece V-link attachment upon which are formed the inclined driving surfaces which frictionally engage the grooved wheel;

Figure 7 is a plan view of the link attachment shown in Figure 6;

Figure 8 is a fragmentary transverse sectional view, similar to Figure 2, but showing a V-link attachment with selective oppositely inclined driving surfaces, thus adapting the chain for duplex service, i. e., for cooperation on one side with sprockets and/or grooved wheels and, upon the other side, for cooperation with grooved wheels only; and Figure 9 is a fragmentary side elevation of the form of attachment shown in Figure 8.

Referring to the annexed drawing in which the same parts are indicated by the same respective numbers in the several views, the improved chain comprises spaced V-elements 1 and connecting or inside elements 2. The V-elements 1 are the improved link attachments to which reference has been made. The V-element 1 is a unitary structure having opposed longitudinal side bars 3 connected by a transverse bridge 5. The inside or connecting elements 2 consist of opposed longitudinal side bars 4. The ends of the side bars 4 of the connecting elements 2 are disposed adjacently within the ends of the side bars 3 of the V-elements 1, said elements 1 and 3 being connected by pins 9 which are passed through aligned holes 3' in side bars 3, and 4' in the side bars 4, whereby the V-elements 1 and connecting elements 2 are articulately connected together to form the complete chain.

The side bars 3 of the V-elements 1 are formed with outwardly and laterally projecting portions 6 which have downwardly and inwardly inclined outer surfaces 7 adapted for frictional engagement with the inside surfaces 21 of an annular grooved portion 20 of a wheel 19. Preferably, the outwardly and laterally projecting bar portions 6 are comprised of spaced upper and lower parts $6'$ and $6^2$, respectively, forming intermediate recessed seats 13 aligned with the side bar holes 3' and 4' and designed to accommodate the ends of the connecting pins 9. Thus, protection is afforded for the ends of the connecting pins 9 since these ends lie within the area encompassed by the inclined driving surfaces 7 of the projections 6, the recessed seats 13 also preventing the turning of the angular heads 15 of the pins 9 and affording chambers within which the cotters 16 at the other end of the pins may be contained.

One end of the pin 9 can be headed to conform to the seat 13, thereby locking the pin 9 securely in position and obviating the rocking, turning, rotating, or otherwise working loose of the pin. The other end of the pin 9 may be a tight drive-fit or press-fit in the opposite side bar 3 and may or may not be mechanically locked. After assembly, the unheaded end of the pin 9 may be riveted or upset so that no part of it protrudes beyond the plane of the frictional surfaces 7. The seat 13 acts as a protective guard for the pin 9 and prevents its being worn.

In the form of assembly shown in the accompanying drawing, it is assumed that the inside or connecting elements 2 are links of a roller chain, such form of chain being shown for purposes of illustration, and, therefore, bushings 11 for the connecting pins 9 are shown mounted in the side bars 4 of the links 2 and mounted upon these bushings 11 are rollers 12 which, when the chain, in part, is engaged by a sprocket, form the sprocket-engaging portions of the chain.

Preferably, as shown in the accompanying drawing, the bridge 5 is located adjacent one edge of the link 1, the upper edge thereof, between the more outwardly extended upper projections 6', thus locating the bridge 5 in a most advantageous position for sprocket tooth clearance.

Referring particularly to Figures 8 and 9, the link therein shown is adapted to operate either with sprockets and/or grooved wheels, or with grooved wheels only. For one of these uses, one side of the chain is used, and for the other use, the other side of the chain is used. In the showing made in Figures 8 and 9, the chain is disposed for use with grooved wheels 10 only. It will be noted that one side of the link is substantially of the structure shown in Figures 1–7, and that the other side of the link is extended to form an additional inclined groove-engaging member 8 whose engaging surface is beveled in the opposite direction from the direction of bevel of the main part of the link. Thus, when utilized as shown in Figures 8 and 9, this additional projecting portion 8 can be utilized for grooved-wheel engagement only, and the main part of the link which is utilized for either sprocket or grooved-wheel driving, or both, when the chain is reversed, is extended outwardly beyond the grooved portion of the wheel 10. The break line between the oppositely inclined frictional surfaces is disposed substantially in alignment with the bridge 5, i. e., adjacent one edge of the main part of the attachment and well removed from the pitch center of the chain.

Certain considerations which will be helpful to an understanding of the invention are as follows:

The V-chain makes possible and practicable chain drives of higher ratios of reduction than are feasible with sprocket drives. V-chains also increase the working life of chain beyond the normal expectancy of other types of chains, and they effect equivalent work at a lower cost. The V-chain is particularly adaptable where it is desired to make a large ratio of reduction at one step, i. e., where a chain is required to operate a very large wheel from a small pinion.

A practical ratio of reduction in sprocket chains is limited to five or six to one. However, the only limits to the reduction possible by V-chain are the shaft size to which the small pinion is secured, the available center distances between the driving and driven shafts, and a ready clearance for the large driven grooved wheel. These considerations do not prevent practicable speed reductions as large as fifteen to twenty to one. Such a drive operates very smoothly and there is no difficulty when the chain elongates in pitch as it often does due to wear. Under such conditions, cumulative joint wear will build up to a point where chain operating over sprocket teeth will occasionally jump the teeth of large sprockets, and also cause shock and irregular driving. The reason is that a worn chain takes on a longer pitch than the sprocket teeth. Of course, these effects are not so pronounced or detrimental for sprockets of smaller sizes because the joint wear in the chain does not accumulate to so great a detrimental extent. However, regardless of the cumulative chain joint wear, or the size of the grooved wheel, the V-chain will function efficiently until it is completely worn out.

The action between V-chain and a grooved wheel is essentially different and much less destructive than that between chain and a sprocket, since the destructive action between a chain and a sprocket increases as the square of the chain pitch and also as the square of the velocity; whereas, the action between the chain and the grooved wheel is largely confined to the wedging gripping action which takes place as the chain seats itself in the groove.

When desired, two or more shafts may be connected by means of V-chain running on grooved wheels of large diameter. This omission of all teeth makes an extra smooth drive, and more power can be transmitted than normal since the chain can be run at higher speeds than is practicable with sprocket wheels. The friction of the V-chain in the tapered groove of the wheel is very great and the drive is practically positive. It is practicable to use oil or other lubricant on the large grooved wheels.

The angle of taper of the groove of the wheel and the cooperating driving surface of the V-chain should be determined within a nominal range. If this angle is too small, a wedging action may be effected which will absorb power in releasing the V-chain from the grooved wheel; and, if the angle is too large, slippage will occur.

The V-element is adaptable as a link attachment to many types of chains, amongst which may be mentioned leaf or pin bar, block, stud or bushing, silent, roller, straight side bar, and offset side bar. In many of these applications, the V-chain would obviate the use of breaking-pin-hubs, overload relay devices, and slip clutches, since, where slippage is essential to absorb impact overloads, etc., as protection against chain breakage or breakage of other parts of the installation, the groove of the driven wheel can be made to conform to the particular requirements. In other words, the angle of the groove of the wheel is varied so as to permit slippage when the maximum permissible chain-working load is approached. Thus, for many installations, the factor of safety is considerably lowered by the use of V-chain.

Also, the V-chain can be used as the transmission medium between a sprocket and a variable speed pulley, such as a pair of laterally movable conical opposed disks, or between two or more variable speed pulleys.

Use of V-chain is advisable wherever there is liability of overloading or jamming that might cause injury of chain or machinery; also, on all installations where obstructions may be encountered, since the V-chain will slip on the grooved wheel and thus avoid breakage or damage.

Although V-chain, insofar as at present known, is higher in cost per foot than other chain, and although it is somewhat heavier, these considerations are not eventual handicaps, because a lighter weight lower ultimate strength V-chain can be used, in many situations, than a chain for like duty operating over toothed wheels; larger ratios of reduction are possible which eliminate many double or multiple reduction drives with attendant jack shafts, bearings, bases, etc.; and, although the impact of chain on sprocket teeth increases in direct proportion to the increase in chain weight, the centrifugal chain force is entirely absorbed by the tooth reaction. Furthermore, when a large grooved wheel is utilized for the slow speed shaft, this wheel will cost less than a sprocket of equal diameter since the additional cost of the slightly greater amount of material involved is more than overcome by the speed and economy with which a V-groove can be turned as compared with the cost and time of cutting sprocket teeth.

Particular attention is directed to the fact that the bridge type of V-chain shown and described as the preferred form limits side bar deflection to a minimum. Thus, the connecting pins are much less likely to work loose from their mechanical locks or press-fits. The bridge type of V-chain also adds strength and elasticity making the chain unusually resilient and shock absorptive.

If the connecting pins are headed flush with and conform to the outside friction surfaces of the outwardly projecting link parts, these pins act as additional bridges at the pitch line of the V-chain and thus absorb deflection stresses caused by the wedging action when the chain engages the grooved wheel.

When, as shown in the accompanying drawing, the bushing for roller type chain, which bushing is locked in the side bars of the roller link, is extended to a point where its ends are very nearly in contact with the inside faces of the side bars of the V-link attachment, then all deflection tendencies are limited to an amount equal to the clearances between the ends of the bushing and the inside faces of the side bars of the V-link attachment. Thus, the bushing in this case acts as an additional bridge between the side bars of the V-link attachment.

If it is desired to accommodate standard chain attachments, for carrying loads, etc., the outer connecting bridge of the V-link attachment can be extended even further outwardly and lengthened and holes provided therein to accommodate such attachments, and thus loads carried at the center line of the chain, which is the most desirable position upon the chain in which to carry the loads.

What I claim is:

1. A one-piece V-chain element comprising opposed longitudinal side bars having laterally outwardly projecting portions with friction surfaces for operative engagement with a grooved wheel, some of said friction surfaces on each side bar being oppositely inclined, and a transverse bridge member secured to and integrally connecting the side bars.

2. A one-piece V-chain element comprising opposed longitudinal side bars having laterally outwardly projecting portions at the top and bottom of each end with inclined spaced friction surfaces for operative engagement with a grooved wheel, and a transverse bridge member connecting the intermediate portions of the side bars adjacent their tops.

3. A chain for sprocket driving or friction driving or, in part, sprocket driving and, in part, friction driving, comprising longitudinally spaced unitary V-chain elements, and other elements consisting of opposed side bars interspersed with the V-chain elements, and means articulately connecting adjacent elements, the opposed side bars of said other elements being of sufficient length to permit sprocket driving therebetween, each of said V-chain elements having connected side bars with friction surfaces, some of said friction surfaces on each side bar being oppositely inclined.

4. A chain for sprocket driving or friction driving or, in part, sprocket driving and, in part, friction driving, comprising longitudinally spaced unitary V-chain elements, and other elements consisting of opposed side bars interspersed with the V-chain elements, and pins articulately connecting adjacent elements, the opposed side bars of said other elements being of sufficient length to permit sprocket driving therebetween, each of said V-chain elements having opposed side bars, each of said last-mentioned side bars having at each end spaced inclined friction surfaces, and bridge members disposed centrally of and connecting the last-mentioned opposed side bars, the connecting pins associated with the respective V-chain elements being seated at their ends in the spaces between adjacent friction surfaces.

FERDINAND H. DALRYMPLE.